(12) United States Patent
Murakami et al.

(10) Patent No.: US 7,744,169 B2
(45) Date of Patent: Jun. 29, 2010

(54) PIN ASSEMBLY OF TRACK ROLLER BOGIE IN CRAWLER TYPE TRAVELING APPARATUS AND CRAWLER TYPE TRAVELING APPARATUS WITH THE ASSEMBLY

(75) Inventors: Shota Murakami, Osaka (JP); Tsuyoshi Yoshida, Osaka (JP)

(73) Assignee: Komatsu Ltd., Tokyo (JP)

( * ) Notice: Subject to any disclaimer, the term of this patent is extended or adjusted under 35 U.S.C. 154(b) by 352 days.

(21) Appl. No.: 10/574,977

(22) PCT Filed: Oct. 6, 2004

(86) PCT No.: PCT/JP2004/014732
§ 371 (c)(1),
(2), (4) Date: Apr. 7, 2006

(87) PCT Pub. No.: WO2005/035343
PCT Pub. Date: Apr. 21, 2005

(65) Prior Publication Data
US 2007/0126285 A1      Jun. 7, 2007

Related U.S. Application Data

(63) Continuation of application No. 10/683,269, filed on Oct. 14, 2003, now abandoned.

(51) Int. Cl.
*B65D 53/00*      (2006.01)
*F01M 11/04*      (2006.01)
(52) U.S. Cl. ...................................... 305/105; 305/118
(58) Field of Classification Search ......... 305/129–130, 305/132, 136, 138, 104–106
See application file for complete search history.

(56) References Cited

U.S. PATENT DOCUMENTS

| 3,463,560 | A | * | 8/1969 | Dadds et al. ................. 305/118 |
| 3,522,962 | A | * | 8/1970 | Poker, Jr. et al. ............ 305/104 |
| 3,554,588 | A | | 1/1971 | Reinsma et al. |
| 3,601,454 | A | | 8/1971 | Reinsma |
| 3,829,173 | A | | 8/1974 | Stedman |
| 4,339,156 | A | | 7/1982 | Livesay |

(Continued)

FOREIGN PATENT DOCUMENTS

JP      2-109640      9/1990

(Continued)

*Primary Examiner*—Jason R Bellinger
(74) *Attorney, Agent, or Firm*—Fish & Richardson P.C.

(57) ABSTRACT

A pin assembly suitable for mounting a track roller bogie on a track frame of a crawler type traveling apparatus includes first to third rings disposed on an outer peripheral surface of a pin having lubricant supply passages. Seals are disposed between end faces of the respective rings and end faces other than those of the seals are formed in slide contact faces, which slidably direct contact with each other. As compared with a conventional case in which spacers are installed between the first to third rings, the total wear amount of the slide contact faces is remarkably reduced, the number of parts is reduced by abolishing the conventional spacers which caused defective lubrication, and a load between the rings in a thrust direction is directly received between the rings. As a result, the troublesomeness of an assembly of track roller bogie and a reduction in service life due to defective lubrication can be eliminated.

6 Claims, 7 Drawing Sheets

| U.S. PATENT DOCUMENTS | | | | FOREIGN PATENT DOCUMENTS | | |
|---|---|---|---|---|---|---|
| 4,445,582 | A | 5/1984 | Andersson | JP | 2-132593 | 11/1990 |
| 4,582,367 | A | 4/1986 | Jacquet et al. | JP | 5-29890 | 4/1993 |
| 4,583,791 | A | 4/1986 | Nagata et al. | JP | 2560322 | 10/1997 |
| 4,817,746 | A | 4/1989 | Purcell et al. | JP | 10-297550 | 11/1998 |
| 5,997,109 | A | 12/1999 | Kautsch | JP | 2001-225770 | 8/2001 |
| 6,607,256 | B2 | 8/2003 | Yoshida et al. | JP | 2002-362441 | 12/2002 |
| 2002/0185915 | A1 | 12/2002 | Yoshida et al. | | | |
| 2005/0077093 | A1* | 4/2005 | Murakami et al. ........... 180/9.1 | | | |

\* cited by examiner

PRIOR ART

PIN ASSEMBLY OF TRACK ROLLER BOGIE IN CRAWLER TYPE TRAVELING APPARATUS AND CRAWLER TYPE TRAVELING APPARATUS WITH THE ASSEMBLY

CROSS-REFERENCE TO RELATED APPLICATION

This application is a national stage of PCT application PCT/JP2004/014732 filed on Oct. 6, 2004 ("PCT Application"). The PCT Application is a continuation of U.S. patent application Ser. No. 10/683,269 ("'269 application") entitled "Pin Assembly for Track Roller Bogie of Track-Type Drive System" filed on Oct. 14, 2003, and now abandoned. By virtue of the relationship between this application and the PCT Application, and the relationship between the PCT Application and the '269 application, this application claims the benefit of priority to the '269 application.

TECHNICAL FIELD

The present invention relates to a pin assembly and a crawler type traveling apparatus employing the pin assembly in a rotation portion. In particular, the invention relates to a pin assembly for axially supporting a track roller bogie (or, "bogie", hereafter) of a crawler type traveling apparatus, and to a crawler type traveling apparatus including the pin assembly axially supporting the bogie.

BACKGROUND ART

A crawler type traveling apparatus drives a vehicle to travel in such a manner that a sprocket wheel drives a crawler chain formed of a large number of track shoes annually pin-linked together. Compared to the case of a wheel-using traveling apparatus, in the case of the crawler type traveling apparatus, the ground contact area is large. As such, the crawler type traveling apparatus is primarily adapted to vehicles for traveling on, for example, unleveled surfaces of the ground, snow covered surfaces of the ground, and soft surfaces of the ground, and in battlefields and civil work sites.

FIG. 1 shows a typical crawler type traveling apparatus. The crawler type traveling apparatus is substantially the same as a crawler type traveling apparatus disclosed in Japanese Unexamined Patent Application Publication No. 2001-225770 (Publication 1). A one-end portion of a track frame 1 is mounted on a vehicle body (not shown) through a pivot shaft 2 such that the one-end portion of the track frame 1 can swing, and an idler tumbler 3 is rotatably axially supported to an end portion on the side of the pivot shaft 2. Bogies 5 including track rollers 6 are mounted to lower portions of the track frame 1. In general, two types exist in regard to the method of mounting track rollers or bogies having track rollers to the track frame: one type is to mount the track rollers by fixing positions thereof and the other type is to mount the track rollers in a vertical direction such that the track rollers swing. In FIG. 1, the crawler type traveling apparatus is shown, which comprises the latter type of bogies including track rollers mounted in the vertical direction such that the track rollers swing. A crawler chain 8 is wound around the idler tumbler 3, the track rollers 6, the sprocket wheel 4, and carrier rollers 7. According to the latter type, the track rollers 6 are movable following a vertical movement of the crawler chain 8, so that even more stable grounding can be accomplished.

FIG. 4 shows an exploded view when the bogie 5 is assembled with respect to the track frame 1, and FIG. 5 is a cross sectional view taken along the line V-V of FIG. 5. FIG. 5 corresponds to, for example, FIG. 2 shown in Japanese Unexamined Patent Application Publication No. 2001-225770 (Patent Publication 1). In basic structures, the crawler type traveling apparatus shown in FIGS. 1, 4 and 5 and component members thereof do not have substantial differences from a crawler type traveling apparatus described below and component members thereof according to an embodiment of the invention.

As shown in FIGS. 4 and 5, the conventional bogie 5 has also a first bogie link 9 and a second bogie link 10. The first bogie link 9 has first and second shaft bearing portions 9a, 9b in a front-rear directional both end portions of the track frame 1. The first and second shaft bearing portions 9a, 9b are forked into pairs of left and right portions, respectively. The first shaft bearing portions 9a, 9a, formed in one end of the first bogie link 9 are rotatably supported on left and right brackets 11, 11 of the track frame 1 via a pin assembly 12, respectively. The second shaft bearing portions 9b, 9b have angularly columnar cavity portions 9b", 9b" which are anteroposteriorly communicated, and the second shaft bearing portions 9b, 9b are disposed in positions bent in a vertically lower direction from a horizontal line passing through the first shaft bearing portions 9a, 9a. A pair of left and right second bogie links 10 and 10 independent of one another are inserted into the cavity portions 9b", 9b" of the second shaft bearing portions 9b, 9b, respectively, and a central portion thereof is rotatably supported by the second shaft bearing portions 9b, 9b of the first bogie link 9. The second bogie link 10 is formed from a vertically flat, reversed isosceles triangular plate, and a shaft bearing opening 10a is formed in a central portion thereof. The pair of front and rear track rollers 6, 6 are rotatably mounted to both ends of the second bogie links 10, 10.

FIG. 6 is a vertical cross sectional view showing an example of the structure of the conventional pin assembly 12 used in the crawler type traveling apparatus shown in FIG. 5. A pin assembly similar thereto is also shown in U.S. Pat. No. 3,554,588 (Patent Publication 2). FIG. 7 shows an enlarged view of a portion B indicated by an arrow in FIG. 5. Referring to FIG. 4 and in accordance with FIGS. 5 to 7, a conventional configuration of a shaft bearing structure of the first bogie link 9 with respect to the track frame 1 will be described hereinbelow. The pair of left and right brackets 11, 11 are arranged on lower surfaces of the track frame 1. As shown in FIG. 5, the respective brackets have a pair of left and right, first and second brackets 11a, 11b extending downward vertically in parallel to one another. Pin press-in openings 11c having the center on the same center line are formed in the respective first and second brackets 11a, 11b. Respective portions of the pin assembly 12 are press fitted into the pin press-in openings 11c, 11c of the pair of left and right brackets 11, 11. As shown in FIGS. 5 and 6, the conventional pin assembly 12 includes 14 members in total, which are a pin 13, first to third rings 14 to 16, two spacers 17, four floating seals 18, and four O-rings 19.

In the pin 13, there are formed a lubricating oil filling portion 13a extending along the center line of the pin 13 with one end sealed by a sealing cap and the other end opened; a lubricant outflow hole 13b which linearly radially extends from the lubricating oil filling portion 13a to the outer peripheral surface and opens; and a lubricant passageway 13c that communicates with the opening of the lubricant outflow hole 13b and extends in parallel to the center line of the pin 13 to reach disposition positions of the respective spacers 17.

The first ring 14 and the third ring and 16 are disposed in both end portions of the pin 13, and are irrotatably press fitted into the pin 13. The second ring 15 is interposed between the first and third rings 14, 16, and is externally fitted to the pin 13 rotatably. The first ring 14 is formed of a bottomed ring body, and has a closed portion 14c in a portion opposing an open side end face of the lubricating oil filling portion 13a. Annular recessed grooves 14a, 15a, and 16a for fixedly fitting the floating seals 18 and O-rings 19, respectively, are formed in substantially central portions of respective opposite end faces of the first and second rings 14, 15 and the second and third rings 15, 16. Further, annular spacer fitting grooves 14b, 15b, and 16b, respectively, communicating with the recessed grooves 14a, 15a, and 16a of the first to third rings 14 to 16 and opened on opposite faces and inner peripheral surfaces of the respective first to third rings 14 to 16 are formed in the internal sides of the respective recessed grooves 14a, 15a, and 16a. The respective spacers 17 are slidably fitted in the respective fitting grooves 14b, 15b, and 16b. Inner surfaces of the fitting grooves 14b, 15b, and 16b and the peripheral surfaces of the spacers 17 are used as slide faces.

The respective spacers 17 have rectangular cross sections, and are slidably interposed between the rings 14 to 16 from the viewpoint of difficulty in processing of the pin assembly 12, especially in securing processing accuracy of the respective opposite faces of the first to third rings 14 to 16 and corrective processing during the assembly of the pin assembly 12. Further, in the event that loads in the thrust direction occur when the traveling surface of the vehicle unevenly contacts with the track shoes with vertical irregularity in the right-left direction (right-left direction in FIG. 5) of the track shoes, the spacers 17 are provided to allow the thrust loads to be mutually transferred between either the first ring 14 or the third ring 16 and the second ring 15. As disclosed in Utility Model Registration Publication No. 2560322 (Patent Publication 3), interposing of such spacers has been employed for many years. On the other hand, small gaps are formed between the opposite end faces in the external sides of the recessed grooves 14a, 15a, and 16a provided for fitting the floating seals 18 and the O-rings 19. As a consequence, direct contact does not occur between the end faces of the respective rings 14 to 16, in the conventional pin assembly 12.

In the pin assembly 12 having the construction described above, the second ring 15 is inserted into a pin press-in opening 9a' of the shaft bearing portion 9a of the first bogie link 9, and first and third rings 14, 16 are press-fixed into a pin closely fitting opening 11a formed in the bracket 11 of the track frame 1. Accordingly, the pin 13 is immobilizably fixed to the bracket 11 of the track frame 1 via the first and the third rings 14, 16, and the first shaft bearing portion 9a of the first bogie link 9 rotates about the pin 13 via the second ring 15. In this event, also the spacers 17 are externally fitted relatively and slidably with respect to the pin 13 and the first to third rings 14 to 16.

On the other hand, the first and third rings 14, 16 of a pin assembly 12 having the same structure as the pin assembly 12 described above are press-fixed onto the inner surface of a pin press-in opening 9' formed in the second shaft bearing portion 9b of the first bogie link 9. In this event, the second ring 15 of the pin assembly 12 is rotatably inserted together with the spacers 17 into a pin press-in opening 10a' formed in the shaft bearing opening 10a of the second bogie link 10. Consequently, the first bogie link 9 rotates relative to the track frame 1 via the pin assembly 12, and the second bogie link 10 rotates relative to the first bogie link 9 via another pin assembly 12.

In the meantime, rotation portions of the second ring 15 and the pin 13 and slide contact portions including the spacers 17 between the first to third rings 14 to 16 need to be lubricated with lubricant. However, for the purpose of preventing the lubricant from leaking out and for the purpose of protecting the rotation portions and the slide contact portions from soil particles such as sand and silt, the rotation portions and the slide contact portions are sealed from the outside. FIG. 6 is an enlarged view of peripheral portions of rotation portions and slide contact portions of the second ring 15 and the third ring 16 indicted by the arrow B in FIG. 5. In this case, for sealing purposes, the annular recessed grooves 14a, 15a, and 16a are provided in the central portion of the opposite faces of the respective first to third rings 14 to 16, in which the pair of left and right floating seals 18, 18 are fitted. These floating seals 18, 18 contact with each other under pressure by using the pair of O-rings 19, 19. The floating seals 18, 18 and the O-rings 19, 19 prevent the lubricating oil which is supplied through the lubricant passageway 13c of the pin 13 from flowing to the outside from, for example, rotation portions and slide contact portions, and concurrently prevent soil particles from entering into rotation portions and slide contact portions from the outside.

Patent Publication 1: Japanese Unexamined Patent Application Publication No. 2001-225770

Patent Publication 2: U.S. Pat. No. 3,554,588

Patent Publication 3: Utility Model Registration Publication No. 2560322

DISCLOSURE OF INVENTION

Problems to be Solved by the Invention

According to the structure of the pin assembly described above, end faces of the first to third rings require to be formed with as many as 10 component members, namely, two pairs of floating seals, two pairs of O-rings, and two spacers. As such, not only assembly of the pin assembly requires very complicate processes, but also it requires high assembly accuracy. Further, for the spacer, all outer circumferential surfaces thereof needs to be lubricated; however, since the cross section thereof is rectangular, the lubricating oil does not smoothly circulate onto the outer surfaces, thereby potentially shortening the component service life because of seizure and the like. In other words, labyrinths are formed in portions that are to be lubricated between the first to third rings and the respective spacers, thereby increasing the possibility of causing lubrication failure. Further, in order to solve these problems, it is contemplated that the spacers are formed by using a porous material such as porous cast steel; however, in this case, a problem arises in that manufacturing costs are increased.

In addition, in the aforementioned pin assembly, while the first and third pins are fixed to the pin, the second link is fitted rotatably to the pin and at the same time, the spacers are internally fitted into the spacer fitting grooves such that the spacers are slidable with respect to adjacent end faces of the first to third rings. The respective spacers, with receiving high loads in the thrust direction, are taken around with the rotation of the second ring. With the taking around, the spacers are irregularly rotated between the immobile first and third rings and the rotatable second ring, thereby causing unexpectedly large amounts of wear on seven slide contact faces between the first and third rings and the respective spacers. In this event, the amount of wear of the spacer is greater, compared with the amount of wear in the opposite faces of the first to third rings. As a consequence, gaps between the first to third rings and the spacers are enlarged, whereby not only backlash occurs between the first to third rings, but also the loads in the thrust direction are less directly received, so as to lead to unnecessary consumption of the lubricating oil. In addition, at the same time as the above condition, a linear contact pressure between the floating seals is varying, thereby leading to deterioration in sealing function and to further leakage of the lubricant to the outside.

The present invention is made under these circumstances, and objects thereof are to provide a pin assembly and a crawler type traveling apparatus employing the pin assembly, the pin assembly decreasing the number of parts, excelling in assembly processability, and solving the problem of an increased amount of wear caused by interposing spacers having rectangular cross sections as conventionally employed and other problems associated thereto.

Means for Solving the Problems

The aforementioned object is achieved by a pin assembly for a track roller bogie of a crawler type traveling apparatus employing a basic construction of a pin assembly comprising a pin including a lubricant filling hole inside thereof and a lubricant outflow hole for outflow of lubricant from the lubricant filling hole to an outer circumference portion thereof; a first ring including an abutment face for abutting with the pin at one end thereof and fixed to the pin; a second ring fitted on the pin to contact with a portion of an other end face of the first ring in a pin axis direction and to be rotatable thereabout; and a third ring fixed to the pin to contact with a portion of an other end face of the second ring in the pin axis direction, characterized in that the pin assembly further comprises an annular recessed groove portion in a portion between respective contact end faces of the first, second, and third rings, and sealing means for sealing to prevent leakage of lubricant is disposed in the recessed groove portion; and the respective adjacent end faces, excluding the respective recessed groove portions, on inner periphery sides of the first, second, and third rings directly contact with one another.

Preferably, each of slide portions between the first, second, and third rings includes a slide contact face through which each of the rings directly contacts and a seal face of the sealing means corresponding to each slide contact face; and the slide face and the seal face forms substantially the same plane in a radial direction. Further, it is preferable that, where outside diameters of the respective first, second, and third rings are d1, d2, and d3, the relationship thereof is d1<d2<d3.

In addition, in the invention related to a crawler type traveling apparatus comprising: a track frame, an idler tumbler, a sprocket wheel, an carrier roller, a track roller bogie supported to the track frame and including a track roller, and a crawler chain wounded around the idler tumbler, the sprocket wheel, the carrier roller, and the track roller, it is characteristic feature that the track roller bogie is axially supported to the track frame by the aforementioned pin assembly of the invention.

According to another invention related to a crawler type traveling apparatus, it is a characteristic feature that the track roller bogie includes a first bogie link axially supported to the track frame and a second bogie link axially supported to the first bogie link and to which the track roller is mounted; and the first bogie link is axially supported to the track frame by the pin assembly.

According to still another invention related to a crawler type traveling apparatus, it is the characteristic features that the track roller bogie includes a first bogie link axially supported to the track frame and a second bogie link axially supported to the first bogie link and to which the track roller is mounted; and the second bogie link is axially supported to the first bogie link by the pin assembly described above.

According to yet another invention related to a crawler type traveling apparatus, it is the characteristic feature that the track roller bogie includes a first bogie link axially supported to the track frame and a second bogie link axially supported to the first bogie link and to which the track roller is mounted; and the first bogie link and the second bogie link are axially supported to the track frame and to the first bogie link, respectively, by the pin assembly.

EFFECTS OF THE INVENTION

According to the pin assembly of the invention, the conventional spacers are abolished and only the sealing means are interposed in slide contact portions to permit the opposite faces of the first to third rings to directly contact with one another. Thereby, eight slide contact faces of the conventional first to third rings with the spacers interposed are substantially reduced to four faces. Consequently, the total amount of wear between the respective rings, in which wear of the spacers is added in a conventional manner, is significantly reduced, and backlash is not easily caused. In addition, the sealing function is less deteriorated, so that the lubricant is less leaked, and a defect such as seizure due to lubrication failure is reduced. Further, since the number of components is reduced according to the abolished spacers, assembly processability for the pin assembly is improved.

In addition, according to a preferred aspect of the invention, in the above-described construction, each slide contact face between the first to third rings and each seal face of the sealing means can be made to the same plane in a radial direction, so that the lubricant is easily circulated onto the slide contact faces between the first to third rings, and the sealing function can be maintained for a long period of time. Further, with the outside diameters d1 to d3 of the first to third rings set as described above, the pin assembly can easily be press fitted into, for example, the track frame and first and second bogies. By employing the pin assembly of the present invention in the crawler type traveling apparatus, a built-in of the bogie with respect to the crawler type traveling apparatus is facilitated and lubrication performance is improved, so that durability is also improved.

DESCRIPTION OF REFERENCE NUMERALS

Figure 1:
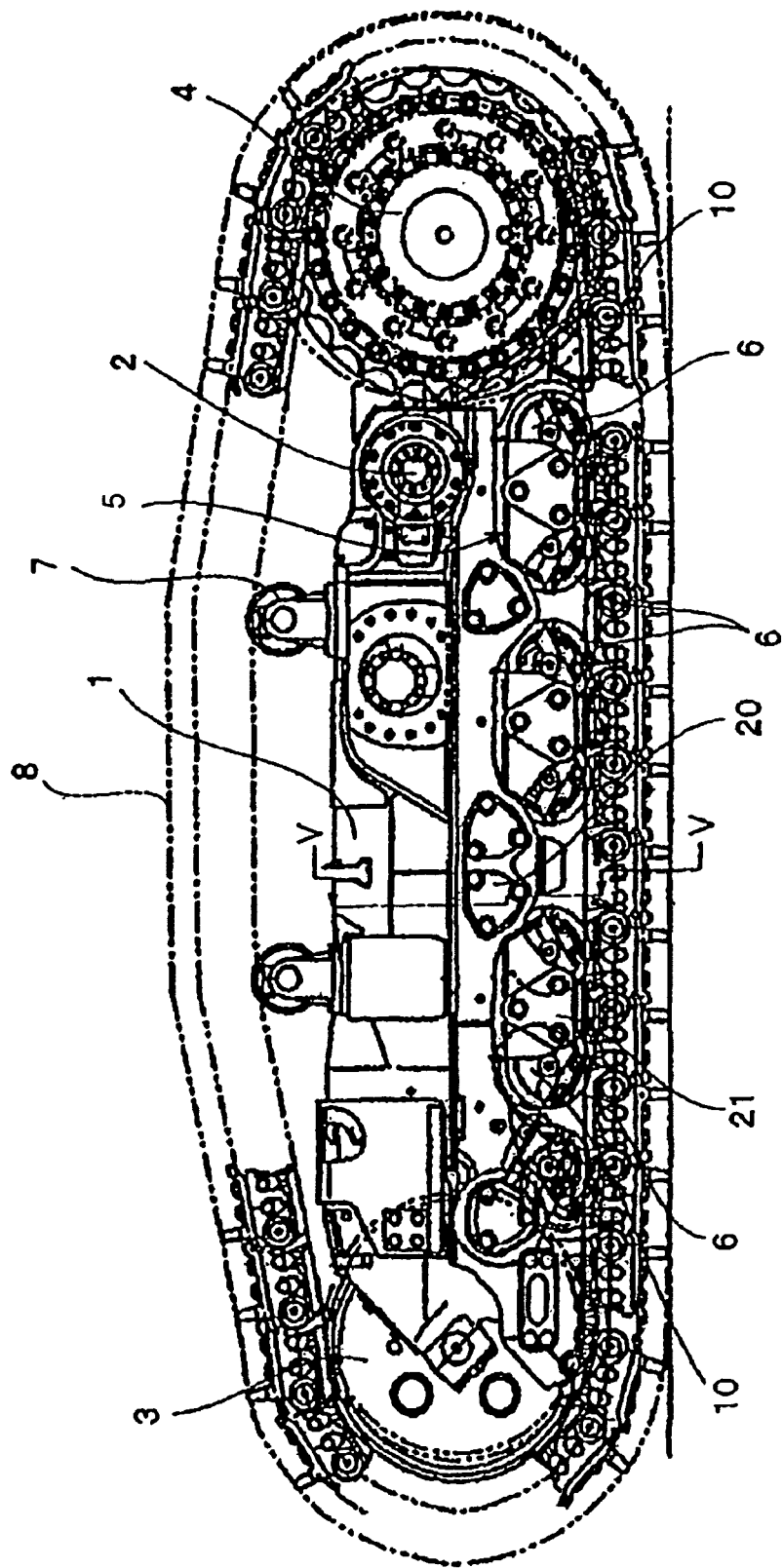
FIG. 1 It is a side view of a general crawler type traveling apparatus including the invention.

1 track frame
2 pivot shaft
3 idler tumbler 4 sprocket wheel
5, 105 bogie
6 track roller
7 carrier roller
8 crawler chain
9 first bogie link
9a, 9b first and second shaft bearing portion
9a', 9b' pin press-in opening
9b" angularly columnar cavity portion
9c frame
10 second bogie link
10a central shaft bearing portion
10a' pin press-in opening
11 bracket
11a, 11b first and second bracket
11c pin press-in opening
12, 112 pin assembly
13 pin
13a lubricant filling portion
13b lubricant outflow hole
13c lubricant passageway
14, 114 first ring
14a, 114a recessed groove portion
14', 114' closed portion
15, 115 second ring
15a, 115a recessed groove portion
16a, 116a recessed groove portion
114b, 115b, 115c, 116b slide contact face
14b, 15b, 16b spacer fitting groove
17 spacer
18 floating seal
18a seal face
19 O-ring

BEST MODE FOR CARRYING OUT THE INVENTION

Figure 2:
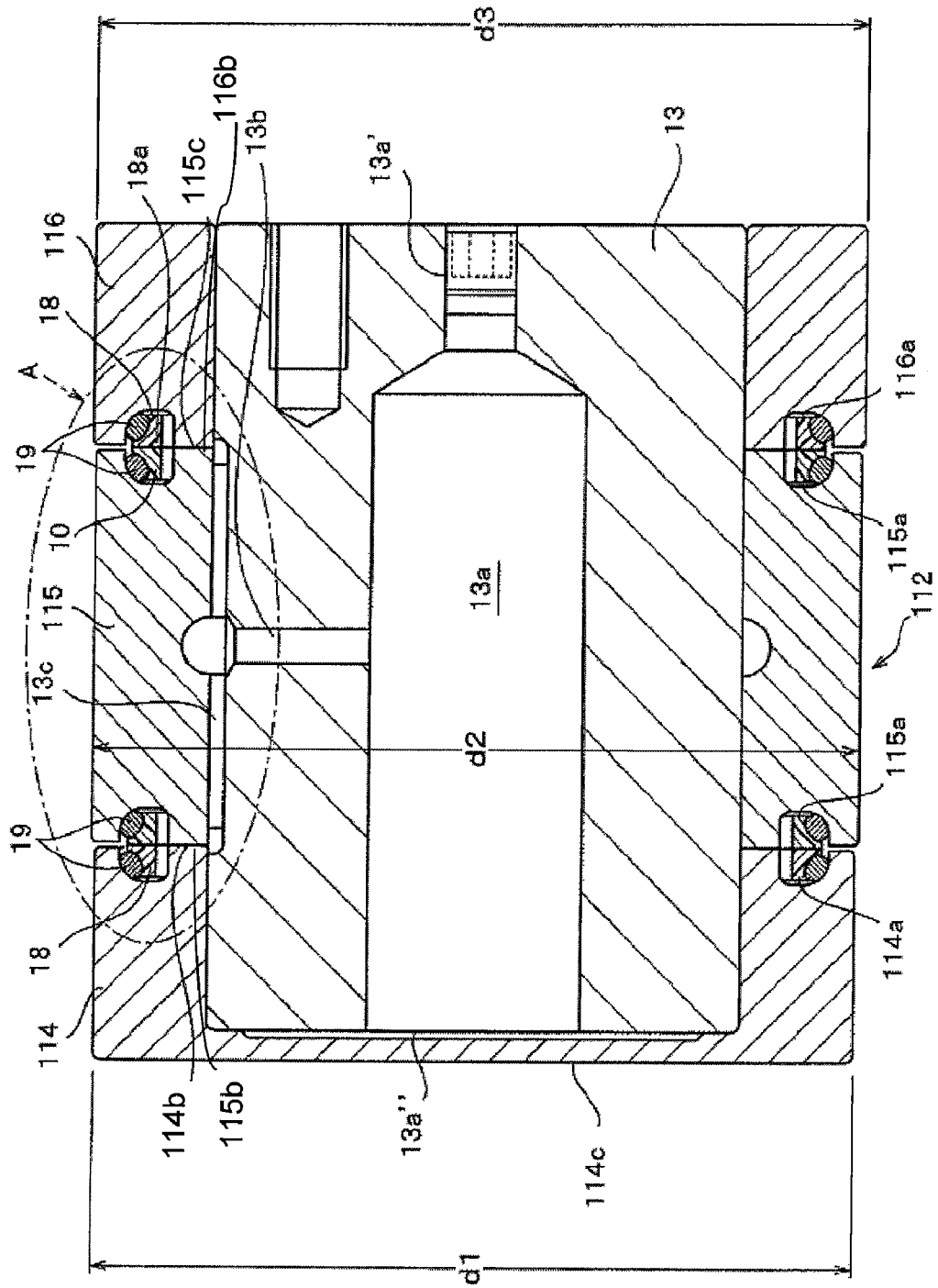
FIG. 2 It is a cross sectional view of a typical embodiment of a pin assembly according to the invention.
Figure 3:
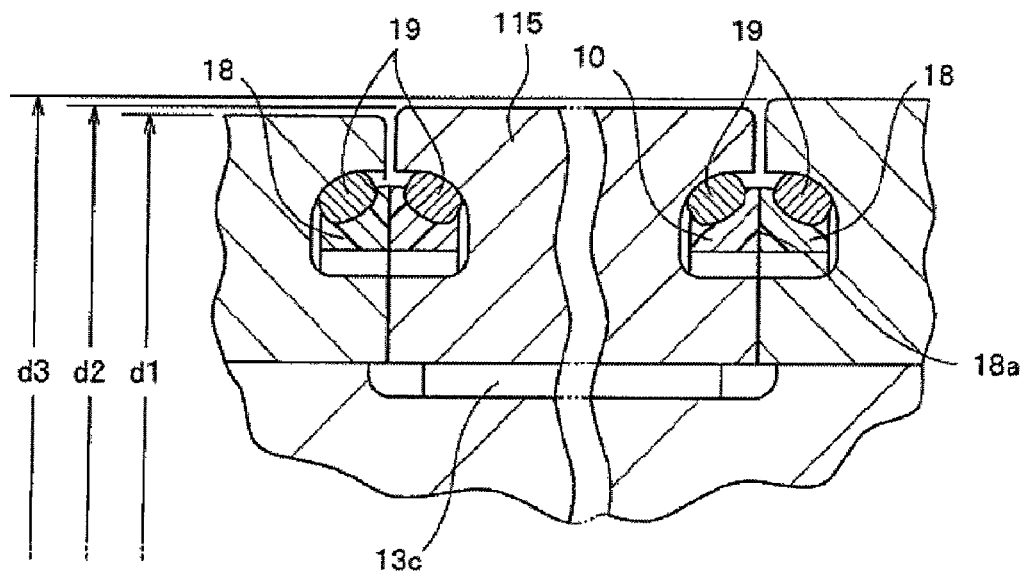
FIG. 3 It is an enlarged cross sectional view of a portion A of FIG. 2.
Figure 4:
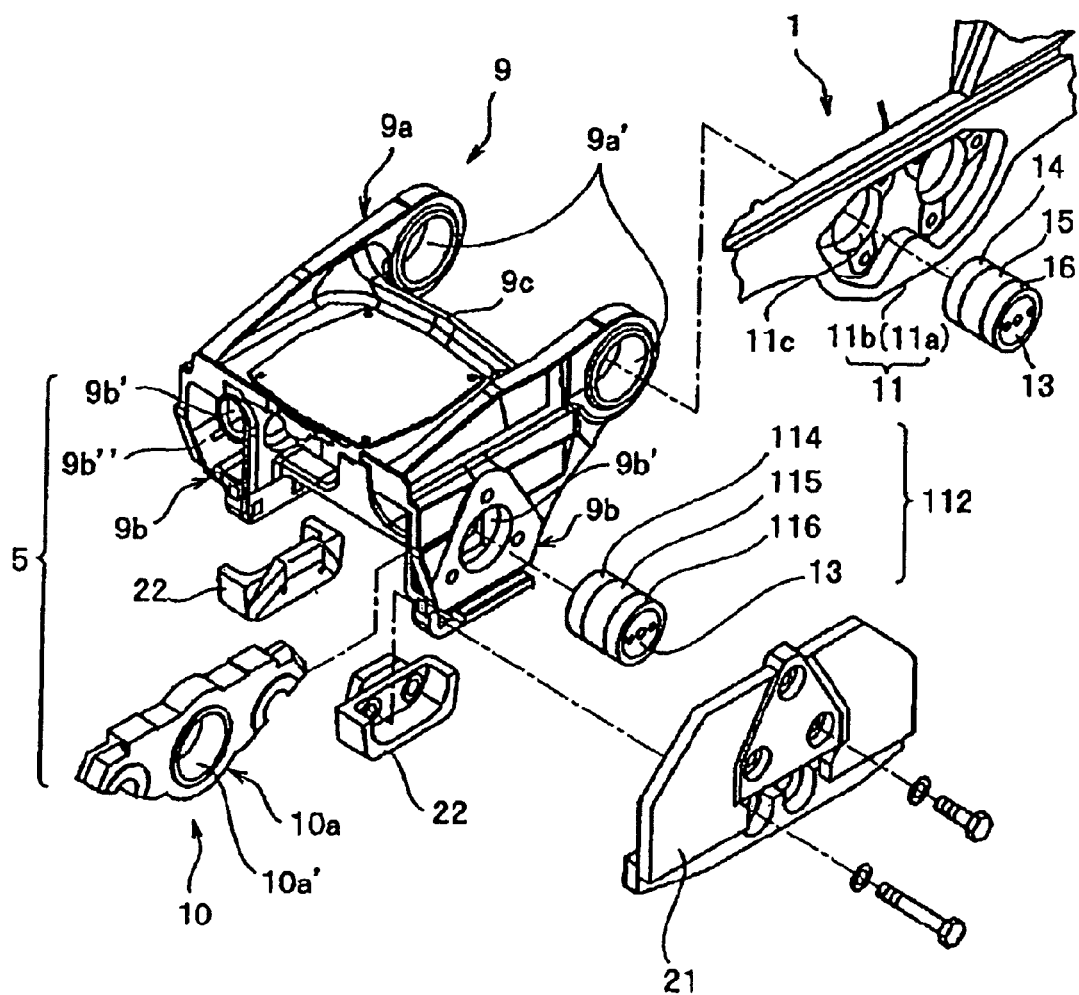
FIG. 4 It is an explanatory view of assembly of a bogie to a track frame by using the pin assembly.

A specific embodiment of a pin assembly of the present invention and a shaft bearing structure using the pin assembly will be described herebelow. FIG. 1 is a side view of a crawler type traveling apparatus according to the invention. In an exterior view, the crawler type traveling apparatus shown in the drawing is not substantially different from the conventional crawler type traveling apparatus, so that detailed description thereof will not be provided here. FIG. 2 is a cross sectional view of a typical embodiment of the pin assembly according to the invention. FIG. 3 is an enlarged cross sectional view of a portion A of FIG. 2. FIG. 4 is an explanatory view of assembly of a bogie to a track frame by using the pin assembly. In the description below, the same names and reference numerals are used to refer to the same components and/or members as the conventional ones already described above.

Major component members of the pin assembly 112, according to this embodiment are a pin 13, first to third rings 114 to 116, floating seals 18, and O-rings 19. A first ring 114 is press fitted into the peripheral surface of the pin 13, a second ring 115 is rotatably and externally fitted in such a manner as to abut an end face of the first ring 114, and a third ring 116 is press fitted in such a manner as to abut an other end face of the second ring 115. Thus, the second ring 114 is disposed in the center sandwiched by the first and third rings 114, 116, whereby only the second ring 115 is rotatable about the pin 13. The first ring 114 is not formed of a simple ring body, but is formed of a so-called bottomed ring body, whose outer end face is closed by a closed portion 114c. An inner surface central portion of the closed portion is made into a recessed face 114c' with an external periphery remained not recessed.

As in the conventional case, annular recessed grooves 114a, 115a, and 116a extending in the circumferential direction are formed in the respective central regions of the opposing end faces of the first, second, and third rings 114 to 116. In the respective recessed grooves 114a, 115a, and 116a, as for the annular floating seals 18 and O-rings 19 as the sealing means of the invention, the floating seals 18 are spaced away from inner wall surfaces of the recessed grooves 114a, 115a, and 116a by the O-rings 19, and seal faces 18a, 18a of the floating seals 18, 18 are brought into intimate contact with one another. Gaps are formed between the opposite faces on external diameter sides with respect to the recessed grooves 114a, 115a, and 116a, and the opposite faces on the internal diameter sides with respect to the recessed grooves 114a, 115b, and 116a form slide contact faces 114b, 115b; 115c, 116b that directly contact with one another.

Figure 5:
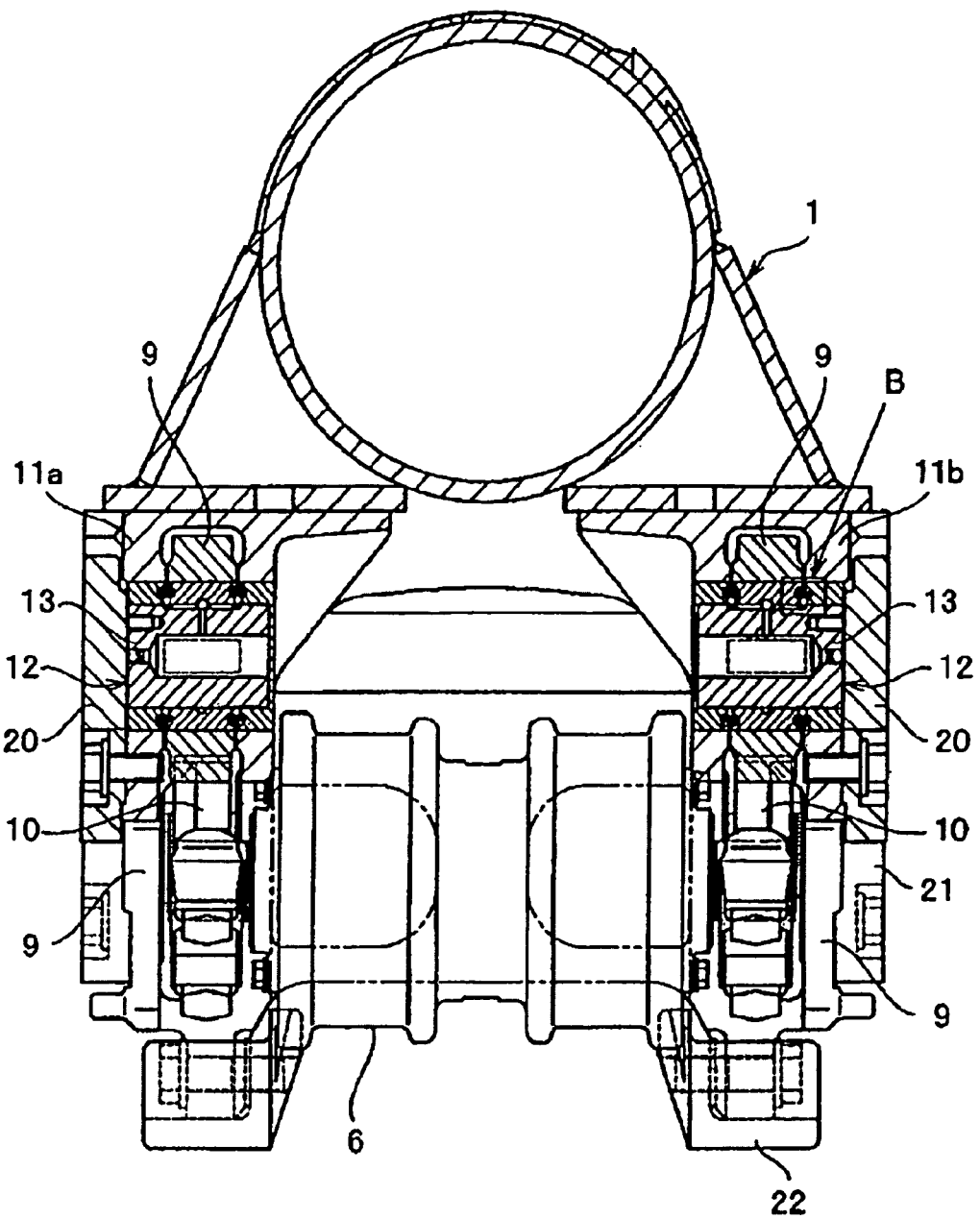
FIG. 5 It is a cross sectional view of a conventional crawler type traveling apparatus shown along the line V-V of FIG. 1.

From the above, it would be understood that the conventional spacers shown in FIG. 5 are excluded from the pin assembly 112 according to the embodiment. This will be described in more detail in accordance with FIG. 2. The pin 13 is formed of carburized carbon steel, and a columnar bore is formed along the center line of the pin 13 so as to have one end with a large-diameter opening and the other end with a small-diameter opening. A sealing cap is detachably attached to a small-diameter opening portion 13a', which is formed to have the small-diameter opening. An end face of a large-diameter opening portion 13a", which is formed to have the large-diameter opening, abuts an outer-peripheral side inner face of the closed portion 114c of the first ring 114 when the first ring 114 is press fitted into the one-end portion of the pin 13. Thus, the one-end portion of the pin 13 is press fitted into the first ring 114, the large-diameter opening portion 13a" is closed, and the small-diameter opening portion 13a' is closed by the sealing cap, whereby the columnar bore is filled with lubricant such as lubricating oil or grease supplied from the small-diameter opening portion 13a', and the lubricant filling portion 13a is formed.

As described above and shown in FIGS. 2 and 3, the second ring 115 to be disposed rotatably with respect to the pin 13 is disposed at the central outer peripheral portion of the pin 13, and the first and third rings 114, 116 are fixedly secured to both end peripheral portions of the pin 13 with the second ring 15 sandwiched therebetween. As a consequence, there are four slide portions between the first and second rings 114, 115 and the second and third rings 115, 116, the four slide portions comprised of two slide contact faces 114b, 115b; 115c, 116b contacting directly between the rings and four seal faces 18a in which two pairs of the floating seals 18 are slid each other. In the pin assembly 12 shown in FIG. 6, however, there are in total six slide portions formed of four slide portions between the end faces of the first to third rings 14 to 16 and the spacers 17 and two slide contact portions with which two pairs of the floating seals 18 make a slide contact. The number of the slide contact portions has a significant influence on the amount of friction as a total generated between the slide contact faces. Reduction in the number of slide contact portions reduces the total amount of wear.

Further, as described above, spacers are excluded according to the embodiment, so that, as shown in FIGS. 2 and 3, the respective slide contact faces 114b, 115b; 115c, 116b of the first to third rings 114 to 116 and slide contact faces 18a between the floating seals 18 can be disposed on the same plane in the radial direction of the pin assembly 112. In this case, for seizure prevention, the first to third rings 114 to 116 are formed by using chrome molybdenum steel as material, and surface hardening treatment such as carburized quenching is applied to the respective slide contact faces 114b, 115b; 115c, 116b of the respective rings 114 to 116. Further, the lubricant is supplied onto the respective slide contact faces 114b, 115b; 115c, 116b from the lubricant filling portion 13a via the lubricant outflow hole 13b and the lubricant passageway 13c.

According to the embodiment, the gaps formed between the ring end faces on the outer periphery sides of the first to third rings 114 to 116 are set to about 1 mm. When the loads in the thrust direction are exerted between the first ring 114 and the second ring 115 and between the second ring 115 and the third ring 116, transfer of forces is primarily carried out directly between the slide contact faces 114b, 115b; 115c, 116b of the respective rings. In order to enhance the transfer efficiency, the pressure of the O-rings 19, 19 is reduced such that contact forces between the respective pairs of the floating seals 18 are reduced so as to be lower than in a normal event.

As described above, in the respective pin assemblies 12 disclosed in the aforementioned Patent Publications 1 to 3, the loads in the thrust direction between the first to third rings 14 to 16 are received through the spacers; however, in the pin assembly 112 of the invention, the loads in the thrust direction are directly transferred between the respective slide contact faces 114b, 115b; 115c, 116b of the first to third rings 114 to 116. In other words, the slide contact faces comprised of the eight faces between the first to third rings 14 to 16 and the spacers 17 in the conventional pin assembly 12 are reduced to four faces by being arranged to carry out direct contact of the first to third rings 114 to 116 in the embodiment.

With the slide contact faces reduced in number, in comparison between the conventional pin assembly 12 and the pin assembly 112 of the embodiment, it was indicated that the total amount of wear in the slide contact faces between the first to third rings 114 to 116 of the pin assembly 112 of the embodiment is reduced by 1/10 of a conventional amount of wear, which was well beyond expectation. This reduction of the amount of wear is attributed not only to the simple exclusion of the spacers, but also in significant part to the fact that exclusion of the spacers enabled the seal faces 18a of the floating seals 18 and the slide contact faces 114b, 115b; 115c, 116b between the first to third rings 114 to 116 to be disposed on the same plane in the radial direction.

Figure 6:
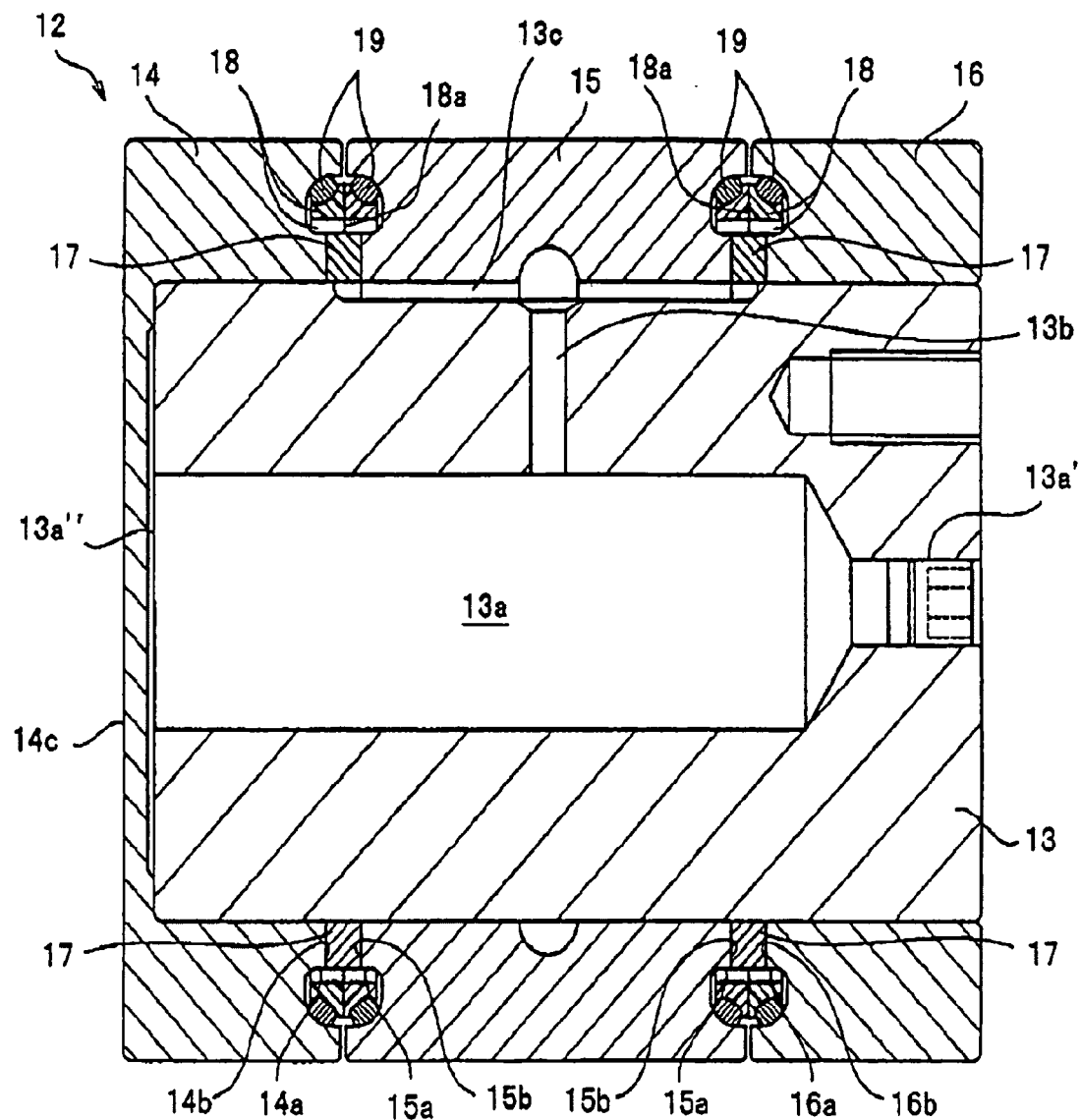
FIG. 6 It is a cross sectional view showing an example of a conventional pin assembly.
Figure 7:
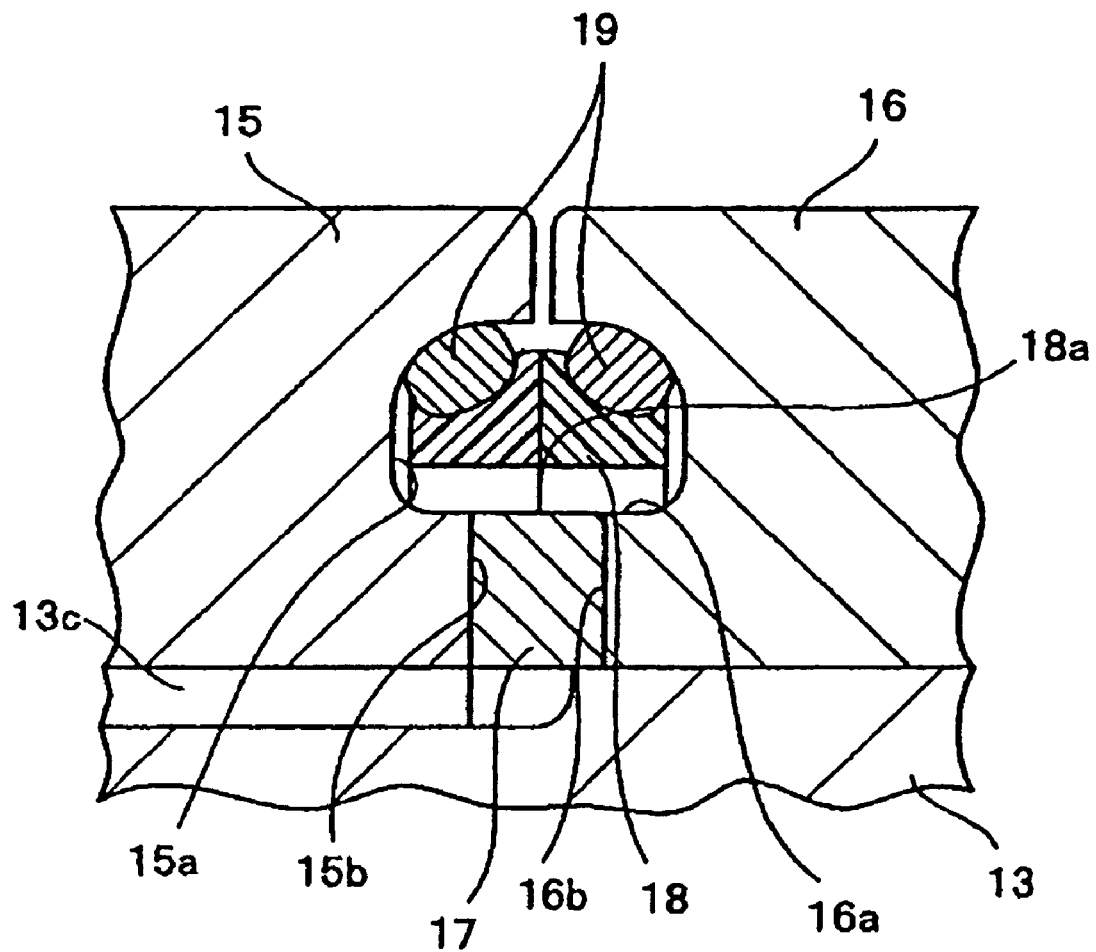
FIG. 7 It is an enlarged cross sectional view of a portion B of FIG. 5.

More specifically, in the conventional pin assembly 12 shown in FIG. 6, the lubricant is supplied through the small gaps between the inner surfaces of the spacer fitting grooves 14b, 15b, and 16b of the first to third rings 14 to 16 and the spacers 17 fitted to the spacer fitting grooves 14b, 15b, and 16b. The lubricant needs to circulate onto the entire surfaces of the spacers 17. However, the assembly structure of the spacer fitting grooves 14b, 15b, and 16b of the first to third rings 14 to 16 and the spacers 17 permits formation of labyrinths. This makes it difficult to supply the lubricant from the lubricating oil filling portion 13a via the lubricant outflow hole 13b and the lubricant passageway 13c to the entire surfaces of the spacers 17. Consequently, seizure can easily occur between the first to third rings 14 to 16 and the spacers 17.

According to the embodiment, however, as shown in FIGS. 2 and 3, the structure permits direct sliding contact of the end faces of the first to third rings 114 to 116. As such, the respective close seal faces 18a of the pair of the floating seals 18 can be mated in the radial direction with the slide contact faces 114b, 115b; 115c, 116b of the first to third rings 114 to 116. Consequently, the lubricant supplied from the lubricating oil filling portion 13a via the lubricant outflow hole 13b and the lubricant passageway 13c is facilitated to flow around to the respective slide contact faces 114b, 115b; 115c, 116b of the first to third rings 114 to 116, thereby avoiding seizure due to shortage of lubrication members across the respective rings.

Causes of the large amount of wear between the conventional first to third rings 14 to 16 and spacers 17 are not known well, but are considered as follows. The spacers 17 interposed between the first and third rings 14 and 16 immobile around the pin and the second ring rotatable around the pin are rotated in association with the rotation of the second ring 15. The associated rotation is not a regular movement and is changed irregularly due to the immobile first and third rings 14 and 16. That is, in the conventional pin assembly 12, irregular sliding occurs between the respective slide contact faces of the first to third rings 14 to 16 and spacers 17, and the loads in the thrust direction constantly act thereon, whereby not only the first to third rings 14 to 16, but also the slide contact faces of the spacers 17 are concurrently worn, thereby increasing the total amount of wear.

In comparison, according to the pin assembly 112 of the embodiment, upon rotation of the second ring 114, the second ring 115 and the first or third ring 114, 116 directly contact and uniformly slide with one another. In this event, as described above, also the lubricant is sufficiently supplied thereonto, so that it seems that the amount of wear on the slide contact faces 114b, 115b; 115c, 116b of the first to third rings 114 to 116 is reduced.

According to the embodiment, in addition to the construction described above, the sizes of the outside diameters of the first to third rings 114 to 116 are designed to be larger in order from the first ring 114, which is firstly pressed fitted, to the third ring 116, which is finally pressed fitted. For example, it is designed such that, where the outside diameter of the first ring 114 is d1, the outside diameter of the second ring 115 is d2, and the outside diameter of the third ring 116 is d3, the relationship thereof is d1<d2<d3. In addition, also the opening diameters of the pin press-in openings 9a', 9b', 10a', and 11c on the mating side, into which the first to third rings 114 to 116 having the respective diameters d1, d2, d3 are press fitted, the pin press-in openings described later, are designed so as to provide sequential opening diameter differences corresponding to the ring diameters being press fitted in. In the pin assembly 112 shown in FIG. 2, the outside diameter differences are set to several hundred micrometers, respectively. Thus, the differences in the order of press fitting are provided to the outside diameters of the first to third rings 114 to 116 and to the inside diameters of the pin press-in openings 9a', 9b', 10a', and 11c. Thereby, when press fitting the pin assembly 12 into the pin press-in openings 9a', 9b', 10a', and 11c, the respective first to third rings 114 to 116 are prevented from being press fitted into the adjacent pin press-in openings 9a', 9b', 10a', and 11c, and are accurately press fitted into the predetermined corresponding pin press-in openings 9a', 9b', 10a', and 11c.

A pin assembly 112 of the invention, which is formed of the above-described typical embodiment, can be suitably adapted to, especially, a shaft support device of a bogie including a track roller of a crawler type traveling apparatus on which high loads are imposed in both radial and thrust directions and of which use environment has a large amount of dust. FIG. 1 shows the overall construction of the crawler type traveling apparatus employing the pin assembly 112 of the invention. FIG. 4 is an exploded perspective view in the event of assembly of the pin assembly to the bogie of the crawler type traveling apparatus. FIG. 5 is a cross sectional view taken along the line V-V of FIG. 1. Except for the pin assembly, the crawler type traveling apparatus does not have substantial differences from the conventional construction, such that detailed descriptions of the overall construction are not provided here.

When the conventional pin assembly 112 is replaced by the pin assembly 112 of the invention, the assembly feature of the bogie to the track frame 1 of the embodiment does not have changes from the conventional assembly feature shown in FIG. 5. FIG. 5 is a cross sectional view taken along the lien V-V of FIG. 1, so that the first bogie links 9 in FIG. 5 are shown such that both surfaces of cross sectional portions and outer surfaces are shown exposed, whereby the same reference numeral 9 is used therefor for easy understanding.

The assembly feature of the bogie to the track frame 1 will be briefly described with reference to FIGS. 4 and 5. A pair of brackets 11 and 11 are provided so as to extend downwardly to both edge portions in the right and left direction of the vehicle, i.e., the lower portions of the track frame 1. A pair of left and right first shaft bearing portions 9a, 9a of the first bogie link 9 are rotatably attached to the pair of brackets 11 and 11 via the pin assemblies 112, 112. Second bogie links 10 are relatively and swingably attached to a pair of left and right second bearing portions 9b of the first bogie links 9 via other pin assemblies 112 having the same structure as above. The brackets 11 provided in the left and right have first and second brackets 11a and 11b extending perpendicularly in parallel to one another, as shown in FIGS. 4 and 5.

As shown in FIG. 4, the first bogie link 9 has a substantially "L" shape in a side view, formed by the pair of left and right first shaft bearing portions 9a, 9a horizontally extending and the pair of left and right second shaft bearing portions 9b, 9b perpendicularly downwardly extending so as to be perpendicular to the respective first shaft bearing portions 9a, 9a, in which bent portions are interconnected by a frame 9c that forms a horizontal support. A pin press-in opening 9a' is formed in a front end portion of the second shaft bearing portion 9b, and a pin press-in opening 9b' is formed in a lower end portion of the second shaft bearing portion 9b. The second bogie link 10 is formed from a deviated, reversed isosceles triangular plate material, and a pin press-in opening 10a' is formed in a central shaft bearing opening 10a. Track rollers 6 are attached to lower surfaces of both end portions of the second bogie links 10.

For assembly of the bogie 5 to the track frame 1 via the pin assemblies 112, first, the pair of left and right first shaft bearing portions 9a, 9a of the bogie link 9 are movably fitted into gaps of the respective first and second brackets 11a, 11b of the pair of left and right brackets 11, 11. Then, the respective pin press-in openings 9a' formed in the first shaft bearing portions 9a, 9a are aligned with the respective pin press-in openings 11c formed in the first and second brackets 11a, 11b. Thereafter, the first and third rings 114, 116 of the pin assembly 12 are press fitted into the pin press-in openings 11c of the first and second brackets 11a, 11b, and concurrently, the second ring 115 of the pin assembly 112 is press fitted into the pin press-in opening 9a' of the first bogie link 9.

The second bogie link 10 is attached rotatably with respect to the first bogie link 9 in the second shaft bearing portion 9b of the first bogie link 9 thus rotatably attached to the track frame 1, via a different pin assembly 112 having the same structure as the above-described pin assembly 112. That is, the second bogie link 10 is movably fitted into the angularly columnar cavity portion 9b" of the first bogie link 9, and alignment is carried out between the pin press-in opening 10a' formed in the central shaft bearing portion 10a and the pin press-in opening 9b' formed in the second shaft bearing portion 9b. Thereafter, the first and third rings 114, 116 of the pin assembly 112 are press fitted into the pin press-in opening 9b' of the second shaft bearing portions 9b, and the second ring 115 of the pin assembly 112 is press fitted into the pin press-in opening 10a' of the second bogie link 10. After the attachment of the bogie 5 to the track frame 1 in the manner described above, a first cover 20 for covering the outer face of each shaft bearing portion of the first and second brackets 11a, 11b is fastened and fixed with bolts, and at the same time, a second cover 21 for covering the outer face of each second shaft bearing portion 9b of the first bogie link 9 is fastened and fixed with bolts. Further, in a similar manner, the inner face and outer face of a lower end portion of the first bogie link 9 are covered by a third cover 22 and the second cover 21, whereby assembly of the bogie 5 to the track frame 1 is completed. The track rollers 6 are rotatably attached to both front and rear end portions of the second bogie link 10.

In the manner described above, except for the track rollers closest to the idler tumbler 3 of the track frame 1, the bogie 5 comprised of the high follow-up capability type first and second bogie links 9 and 10 is assembled to the lower portion of the track frame 1. Then, the one end portion of the track frame 1 is swingably attached to the vehicle body (not shown) via the pivot shaft 2; and the idler tumbler 3 and the sprocket wheel 4 are attached to the both front and rear portions of the track frame 1; and the crawler chain 8 is wound around the idler tumbler 3, the track rollers 6, the sprocket wheel 4, and the carrier rollers 7.

According to a crawler type traveling vehicle having the crawler type traveling apparatus of the invention, the first bogie link 9 pivotally moves about the same pin assembly 112 of the invention, and the both front and rear portions of the second bogie link 10 vertically and pivotally moves about the second pin assembly 112 provided in the one end portion of the first bogie link 9. Accordingly, the pair of front and rear track rollers 6, 6 is enabled to obtain a large bogie stroke from the pivotal movements of the first and second bogie links 9, 10, and different from the conventional cases, the effect of force balance with the idler tumbler 3 is not imposed, so that the follow-up performance to variations in the vertical direction of the crawler chain 8 due to traveling surface variations is improved.

For instance, even in the event that a crawler chain 8 near a lower portion of the sprocket wheel 4 is largely bent when running over rough and uneven terrain portions during reverse travel, the track rollers 6, 6 quickly follow the crawler chain 8 and do not disengage from the crawler chain 8. Further, since the positions of the idler tumbler 3 and the sprocket wheel 4 do not change with respect to the track frame 1, an actual engagement ground length of the crawler chain 8 also does not change. Thereby, even during travel on an irregular terrain with very rough and uneven terrain portions, since the track rollers 6, 6 follow and contact with the tread of the crawler chain 8, crawler chain can be prevented from disengagement without causing problems of the travel even after having traveled over rough and uneven terrain portions, and the ride comfort is improved. Further, the amount of rough and uneven terrain to be covered by the crawler chain 8 is increased, and the track rollers 6, 6 consistently support the vehicle body. Consequently, impact forces after having traveled over rough and uneven terrain portions can be reduced, and the durability of a vehicle and ride comfort can be improved. Further, the actual ground engagement length is stabilized, so that shoe slip can be prevented, and high traction forces can be obtained.

The invention claimed is:

1. A pin assembly of a track roller bogie in a crawler type traveling apparatus, comprising:
   a pin including a lubricant filling hole therein and a lubricant outflow hole for outflow of lubricant from the lubricant filling hole to an outer peripheral portion;
   a first ring including an abutment face for abutting with the pin at one end and fixed to the pin;
   a second ring fitted on the pin to contact with a portion of an other end face of the first ring in a pin axis direction and to be rotable thereabout; and
   a third ring fixed to the pin to contact with a portion of an other end face of the second ring in the pin axis direction,
   wherein outside diameters of the first ring, the second ring, and the third ring are d1, d2, and d3, respectively, a relationship between d1, d2, d3 is d1<d2<d3,
   wherein the pin assembly further comprises an annular recessed groove portion in a portion between respective contact end faces of the first, second, and third rings, and sealing means to prevent leakage of the lubricant disposed in the recessed groove portion, and
   wherein the respective adjacent end faces, excluding the respective recessed groove portions, on inner periphery sides of the first, second, and third rings directly contact with one another.

2. A pin assembly according to claim 1, further comprising slide portions between the first, second, and third rings, wherein each of slide portions between the first, second, and third rings includes a slide contact face through which each of the rings directly contacts and a seal face of the sealing means corresponding to each slide contact face; and the slide contact face and the seal face form substantially a same plane in a radial direction.

3. A crawler type traveling apparatus comprising:
   a track frame;
   an idler tumbler;
   a sprocket wheel;
   a carrier roller;
   a track roller bogie axially supported on the track frame and including a track roller; and
   a crawler chain wound around the idler tumbler, the sprocket wheel, the carrier roller, and the track roller, wherein the track roller bogie is axially supported on the track frame by the pin assembly according to any one of claims 1 or 2.

4. A crawler type traveling apparatus comprising:
   a track frame;
   an idler tumbler;
   a sprocket wheel;
   a carrier roller;
   a track roller bogie axially supported on the track frame and including a track roller; and
   a crawler chain wound around the idler tumbler, the sprocket wheel, the carrier roller, and the track roller, wherein the track roller bogie includes a first bogie link axially supported on the track frame and a second bogie link axially supported on the first bogie link and to which the track roller is mounted, and the first bogie link is axially supported on the track frame by the pin assembly according to any one of claims 1 or 2.

5. A crawler type traveling apparatus comprising:
   a track frame;
   an idler tumbler;
   a sprocket wheel;
   a carrier roller;
   a track roller bogie axially supported on the track frame and including a track roller; and
   a crawler chain wound around the idler tumbler, the sprocket wheel, the carrier roller, and the track roller, wherein the track roller bogie includes a first bogie link axially supported on the track frame and a second bogie link axially supported on the first bogie link and to which the track roller is mounted, and the second bogie link is axially supported on the first bogie link by the pin assembly according to any one of claims 1 or 2.

6. A crawler type traveling apparatus comprising:
   a track frame;
   an idler tumbler;
   a sprocket wheel;
   a carrier roller;
   a track roller bogie axially supported on the track frame and including a track roller; and
   a crawler chain wound around the idler tumbler, the sprocket wheel, the carrier roller, and the track roller, wherein the track roller bogie includes a first bogie link axially supported on the track frame and a second bogie link axially supported on the first bogie link and to which the track roller is mounted, and the first bogie link and the second bogie link are axially supported on the track frame and to the first bogie link, respectively, by the pin assembly according to any one of claims 1 or 2.

* * * * *